(12) United States Patent
Xu et al.

(10) Patent No.: US 12,627,596 B2
(45) Date of Patent: May 12, 2026

(54) METHOD AND APPARATUS FOR DESIGNATED ROUTER SEAMLESS SWITCHOVER

(71) Applicant: Telefonaktiebolaget LM Ericsson (publ), Stockholm (SE)

(72) Inventors: Wei Xu, Beijing (CN); Shuxia Tai, Beijing (CN); Huajie Guo, Beijing (CN); Lei Zhou, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 65 days.

(21) Appl. No.: 18/692,120

(22) PCT Filed: Sep. 15, 2021

(86) PCT No.: PCT/CN2021/118512
§ 371 (c)(1),
(2) Date: Mar. 14, 2024

(87) PCT Pub. No.: WO2023/039747
PCT Pub. Date: Mar. 23, 2023

(65) Prior Publication Data
US 2024/0348537 A1        Oct. 17, 2024

(51) Int. Cl.
*H04L 25/28*        (2006.01)
*H04L 45/023*        (2022.01)
(Continued)

(52) U.S. Cl.
CPC ............ *H04L 45/28* (2013.01); *H04L 45/023* (2013.01); *H04L 45/03* (2022.05)

(58) Field of Classification Search
CPC ................................ H04L 45/28; H04L 45/03
See application file for complete search history.

(56) References Cited

U.S. PATENT DOCUMENTS

| | | | |
|---|---|---|---|
| 8,351,438 B2 * | 1/2013 | Ward | H04L 45/03 370/400 |
| 8,442,046 B2 | 5/2013 | Roy et al. | |

(Continued)

FOREIGN PATENT DOCUMENTS

| | | | | |
|---|---|---|---|---|
| CN | 104486223 B | 4/2018 | | |
| EP | 2421206 A1 * | 2/2012 | ............. | H04L 45/03 |
| WO | 2021/114978 A1 | 6/2021 | | |

OTHER PUBLICATIONS

International Search Report and Written Opinion issued in International Application No. PCT/CN2021/118512 dated Jun. 20, 2022 (10 pages).

(Continued)

*Primary Examiner* — Chirag R Patel
(74) *Attorney, Agent, or Firm* — Rothwell, Figg, Ernst & Manbeck, P.C.

(57)        ABSTRACT

Embodiments of the present disclosure provide method and apparatus for Designated Router (DR) seamless switchover. A method performed by a network device comprises detecting a DR failure event due to a failure DR. The method further comprises detecting that the second edge device is unreachable. The method further comprises holding refresh of router-Link State Advertisements (router-LSA) in a link-state database and flooding procedure, when a Backup Designated Router (BDR) has not declared to be a working DR in an Open Shortest Path First (OSPF) network.

20 Claims, 8 Drawing Sheets

A communication system based on OSPF Network topology

(51) Int. Cl.
   H04L 45/03        (2022.01)
   H04L 45/28        (2022.01)

(56)                     References Cited

U.S. PATENT DOCUMENTS

| 8,717,935 | B2 * | 5/2014 | Lindem, III | H04L 45/12 |
| | | | | 370/401 |
| 8,923,305 | B2 * | 12/2014 | Ward | H04L 47/39 |
| | | | | 370/400 |
| 8,923,312 | B2 * | 12/2014 | Chen | H04L 45/28 |
| | | | | 370/401 |
| 8,964,758 | B2 * | 2/2015 | Lu | H04L 45/28 |
| | | | | 370/219 |
| 9,043,487 | B2 * | 5/2015 | Retana | H04L 45/16 |
| | | | | 370/352 |
| 2003/0218982 | A1 | 11/2003 | Folkes et al. | |
| 2005/0160179 | A1 * | 7/2005 | Retana | H04L 45/32 |
| | | | | 709/238 |
| 2013/0128718 | A1 | 5/2013 | Appalla et al. | |
| 2019/0182182 | A1 | 6/2019 | Mishra et al. | |

OTHER PUBLICATIONS

Katz, D. et al., "Bidirectional Forwarding Detection (BFD)", Internet Engineering Task Force (IETF), RFC 5880, Juniper Networks, Jun. 2010 (49 pages).

Moy, J., "OSPF Version 2", Internet Engineering Task Force (IETF), RFC 2328, Ascend Communications, Inc., Apr. 1998 (244 pages).

\* cited by examiner

Designated Router
10
Backup Designated Router
20
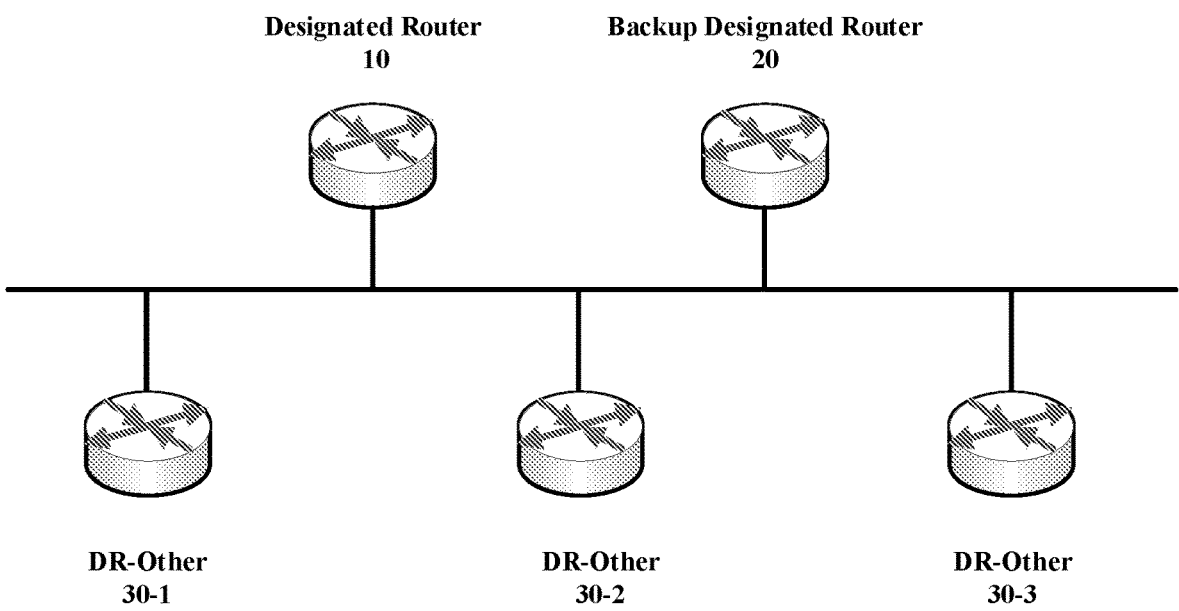
DR-Other
30-1
DR-Other
30-2
DR-Other
30-3
Fig. 1 A communication system based on OSPF Network topology
200
202
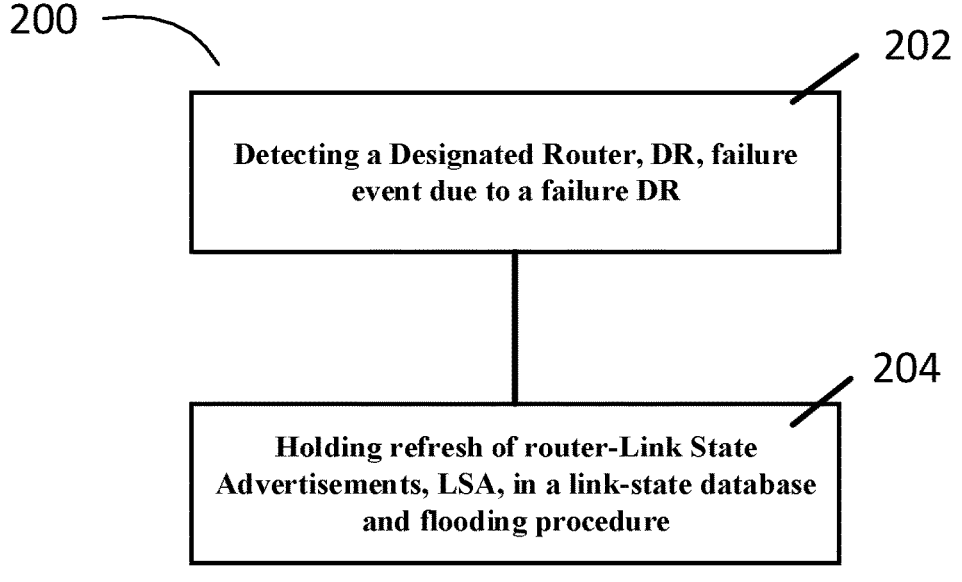
Detecting a Designated Router, DR, failure
event due to a failure DR
204
Holding refresh of router-Link State
Advertisements, LSA, in a link-state database
and flooding procedure
Fig. 2

300

302

Refreshing router-LSA in a link-state database

304

Proceeding with flooding procedure in an OSPF network

Fig. 4 DR Failure Event Process

Fig.5 DR Switchover Done Process

Fig. 6 DR Switchover Timer Expiry Process

1

METHOD AND APPARATUS FOR DESIGNATED ROUTER SEAMLESS SWITCHOVER

CROSS REFERENCE TO RELATED APPLICATIONS

This application is a 35 U.S.C. § 371 National Stage of International Patent Application No. PCT/CN2021/118512, filed 2021 Sep. 15.

TECHNICAL FIELD

The non-limiting and exemplary embodiments of the present disclosure generally relate to the technical field of communications, and specifically to methods and apparatuses for designated router seamless switchover.

BACKGROUND

This section introduces aspects that may facilitate a better understanding of the disclosure. Accordingly, the statements of this section are to be read in this light and are not to be understood as admissions about what is in the prior art or what is not in the prior art.

Request For Comments (RFC) 2328, STD 54, April 1998, describes the specification of the Open Shortest Path First (OSPF) internet routing protocol. OSPF is classified as an Interior Gateway Protocol (IGP). This means that it distributes routing information between routers belonging to a single Autonomous System. The OSPF protocol is based on link-state or Shortest Path First (SPF) technology.

Each OSPF broadcast network or OSPF Non-Broadcast Multiple Access (NBMA) network have a Designated Router (DR). DR becomes adjacent to all other routers on the network. Since the link state databases are synchronized across adjacencies, the DR plays a central part in the synchronization process.

Sometimes, DR failure happens in the network. In order to make the transition to a new DR smoother, there is a Backup Designated Router (BDR) for each broadcast and NBMA network. The BDR is also adjacent to all routers on the network, and becomes Designated Router when the previous DR fails.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In OSPF network, network device proceeds DR and BDR election process. This process is used to calculate DR and BDR of a network. The calculation result is as follows. If the network device is chosen as DR, then its new interface state is DR. If the network device is chosen as BDR, then its new interface state is Backup. Otherwise, its new interface state is DR Other. If the interface state of a network device is DR Other, we call the network device DR-Other device. The detailed election process could reference section 9.4 Electing the Designated Router in the RFC 2328.

When DR failure happens in the network, all DR-Other devices can't compute routes successfully in time before BDR declared to be the working DR. The traffic drop consequently happens during the period of DR switchover. The switchover time may take seconds or even longer in large scale networks to complete topology convergency.

To overcome the above mentioned problem, the embodiments of the present disclosure proposes a DR seamless switchover method.

In a first aspect of the disclosure, there is provided a method performed by a network device. The method comprises detecting a DR failure event due to a failure DR. The method further comprises holding refresh of router-Link State Advertisements (router-LSA) in a link-state database and flooding procedure, when a BDR has not declared to be a working DR in an OSPF network.

In an embodiment, the flooding procedure comprises flooding at least one LSA message to at least one neighbor network device.

In an embodiment, the DR failure event comprises at least one of: Failure event trigged by OSPF hello mechanism, and Failure event trigged by Bidirectional Forwarding Detection (BFD) session down.

In an embodiment, the method further comprises removing at least one routing entry whose next hop is the failure DR in a routing table.

In an embodiment, the method further comprises starting a timer to wait for the BDR declared to be the working DR.

In an embodiment, the method further comprises receiving a network-LSA message from a working DR.

In an embodiment, the method further comprises stopping the timer when a network-LSA message is received from the working DR.

In an embodiment, the method further comprises holding route calculation to prevent update of the routing table.

In an embodiment, the method further comprises refreshing router-LSA in the link-state database and proceeding with the flooding procedure when the timer is stopped or expired.

In an embodiment, the method further comprises proceeding with route calculation. The method further comprises updating the routing table.

In an embodiment, the network device is a DR-Other router or a server with DR-Other function.

In a second aspect of the disclosure, there is provided a method performed by a network device, when a network-Link State Advertisement (network-LSA) message is received or a timer is expired. The method comprises refreshing router-LSA in a link-state database. The method further comprises proceeding with flooding procedure in an OSPF network. The refreshing router-LSA in the link-state database and proceeding with flooding procedure have been held due to a DR failure event.

In an embodiment, the flooding procedure comprises flooding at least one LSA message to at least one neighbor network device.

In an embodiment, the network-LSA message is received from the working DR.

In an embodiment, the OSPF network comprises at least one of: OSPF Broadcast network, and OSPF NBMA network.

In an embodiment, the method further comprises proceeding with route calculation. Meanwhile, it further comprises updating routing table.

In an embodiment, the method further comprises detecting a DR failure event due to a failure DR. Meanwhile, it further comprises holding refresh of router-LSA in a link-state database and flooding procedure, when a BDR has not declared to be a working DR.

In an embodiment, the DR failure event comprises at least one of: Failure event trigged by OSPF hello mechanism, and Failure event trigged by BFD session down.

In an embodiment, the method further comprises removing at least one routing entry whose next hop is the failure DR in the routing table.

In an embodiment, the method further comprises starting a timer to wait for the BDR declared to be a working DR.

In an embodiment, the method further comprises stopping the timer when the network-LSA event is received from the working DR.

In an embodiment, the method further comprises holding the route calculation to prevent update of the routing table.

In an embodiment, the network device is a DR-Other router or a server with DR-Other function.

In a third aspect of the disclosure, there is provided a network device. The network device comprises a processor and a memory coupled to the processor. Said memory containing instructions executable by said processor, whereby said network device is operative to receive a BFD link failure event. Said network device is further operative to hold the refresh of router-LSA in the link-state database and the flooding procedure to neighbor network devices.

In a fourth aspect of the disclosure, there is provided a computer-readable storage medium storing instructions which, when executed on at least one processor, cause the at least one processor to carry out any of the methods according to the first aspect of the disclosure.

In a fifth aspect of the disclosure, there is provided a network device. The network device comprises a processor and a memory coupled to the processor. Said memory containing instructions executable by said processor, whereby said network device is operative to refresh router-LSA in a link-state database. Said network device is further operative to proceed with flooding procedure in an OSPF network. The refreshing router-LSA in the link-state database and proceeding with flooding procedure have been held due to a DR failure event.

In a sixth aspect of the disclosure, there is provided a computer-readable storage medium storing instructions which, when executed on at least one processor, cause the at least one processor to carry out any of the methods according to the second aspect of the disclosure.

In a seven aspect of the disclosure, a computer program product is provided comprising instructions which, when executed on at least one processor and memory, cause the at least one processor to carry out any of the methods according to the first aspect of the disclosure.

In an eight aspect of the disclosure, a computer program product is provided comprising instructions which, when executed on at least one processor and memory, cause the at least one processor to carry out any of the methods according to the second aspect of the disclosure.

In a ninth aspect of the disclosure, there is provided apparatus in a network device. The network device comprises a detecting module and a holding module. The detecting module may detect a DR failure event due to a failure DR. The holding module may hold refresh of router-LSA in a link-state database and flooding procedure, when a BDR has not declared to be a working DR in an OSPF network.

In a tenth aspect of the disclosure, there is provided apparatus in a network device. The network device comprises a refreshing module and a proceeding module. When a network-LSA message is received or a timer is expired, the refreshing module may refresh router-LSA in a link-state database. The proceeding module may proceed with flooding procedure in an OSPF network. The refreshing router-LSA in the link-state database and proceeding with flooding procedure have been held due to a DR failure event.

The present disclosure realizes DR seamless switchover. The traffic drop during DR switchover may be prevented. Further, it may decrease the usage of CPU and memory resource of the network device.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1 shows a communication system based on an OSPF network topology;

FIG. 2 shows a flowchart of a method according to an embodiment of the present disclosure;

DETAILED DESCRIPTION

Figure 3:
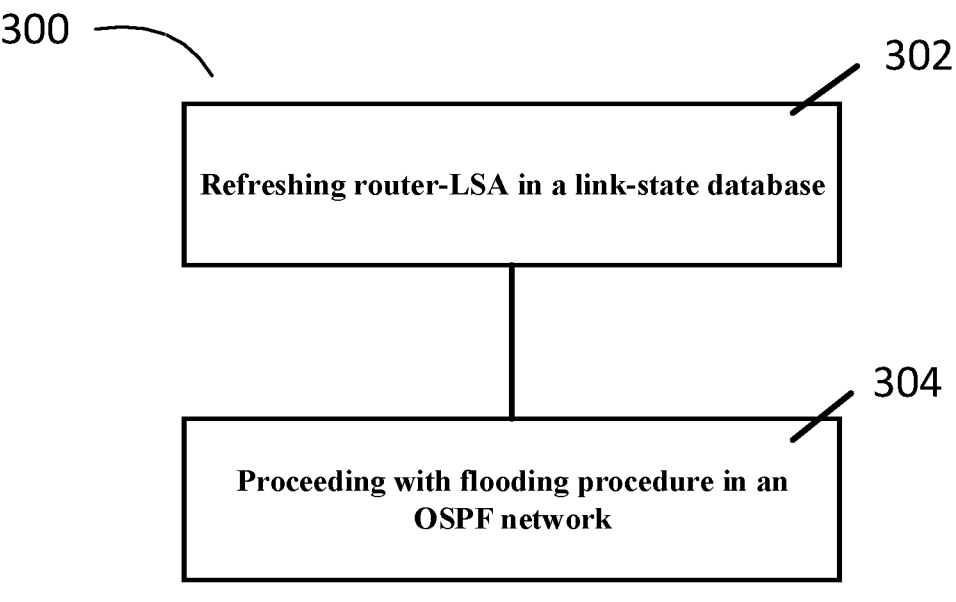
FIG. 3 shows a flowchart of a method according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable (wireless or wired) communication standards. In the following description, the terms "network" and "system" can be used interchangeably. Furthermore, the communications between two communication devices in the network may be performed according to any suitable communication protocols, including, but not limited to, the communication protocols as defined by a standard organization such as IETF. For example, the communication protocols may comprise various route protocols, switching protocols and/or any other protocols either currently known or to be developed in the future.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The term "network device" refers to any suitable physical network device or virtualized network device with a network function in it. For example, network device DR could be a physical router, or a virtualized server with DR function; network device BDR could be a physical router, or a virtualized server with BDR function; network device DR-Other could be a physical router, or a virtualized server with DR-Other function.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the OSPF network topology illustrated in FIG. 1. For simplicity, FIG. 1 only depict some exemplary elements. In practice, a communication system may further include any additional elements suitable to support communication between any two communication devices. The communication system may provide communication and various types of services provided by, or via, the communication system.

It is noted that some embodiments of the present disclosure are mainly described in relation to the Open Shortest Path First (OSPF) Version 2 as defined by RFC 2328 (STD 54, April 1998) being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration may equally be utilized as long as exemplary embodiments described herein are applicable.

RFC 2328 describes the specification of the OSPF Internet routing protocol. OSPF is classified as an Interior Gateway Protocol (IGP). This means that it distributes routing information between routers belonging to a single Autonomous System. The OSPF protocol is based on link-state or Shortest Path First (SPF) technology.

As described in RFC 2328, OSPF broadcast network and OSPF NBMA network have a Designated Router (DR). The DR becomes adjacent to all other routers on the network. Since the link state databases are synchronized across adjacencies, the DR plays a central part in the synchronization process.

When DR failure happened, in order to make the transition to a new DR smoother, there is a Backup Designated Router (BDR) for each OSPF broadcast and NBMA network. The BDR is also adjacent to all routers on the network, and becomes Designated Router when the previous Designated Router fails.

DR and BDR take important role in OSPF broadcast and OSPF NBMA network. But sometimes, the DR may fail because of link fault, node fault or networking maintenance.

When DR failure happens in the network, the routers in the network refresh the router-LSA in the database respectively, then flood router-LSA messages to its neighbors. Before BDR declared to be the working DR, there is no valid network-LSA message presenting the information of the network and attached routers. The IP routing entries through the network are affected. Because at first, the routers remove routing entries when DR fails, then they add the routing entries after receiving network-LSA message from new working DR. So, during the DR switchover period, there is no matched route entry for the new coming traffic, then traffic loss happens. The switchover time may take seconds or even longer in large scale networks to complete topology convergency.

To overcome the above mentioned problem, the embodiments of the present disclosure proposes a DR seamless switchover method.

The present disclosure realizes DR seamless switchover. The traffic drop during DR switchover may be prevented. Further, it can decrease the usage of CPU and memory resource of the network device.

FIG. 1 shows a communication system based on an OSPF network topology. As shown, the communication system comprises three kinds of network devices simply denoted as DR, BDR, and DR-Other. In the network topology, there are one Designated Router (DR) 10, one Backup Designated Router (BDR) 20, and three DR-Other devices 30-1, 30-2, 30-3.

DR generates LSAs for the network and has other special responsibilities in the running of the protocol. The DR is elected by the election process. The DR concept enables a reduction in the number of adjacencies required on a broadcast or NBMA network. This in turn reduces the amount of routing protocol traffic and the size of the link-state database.

When DR failure happens, in order to make the transition to a new DR smoother, there is a Backup Designated Router (BDR) for each broadcast and NBMA network. The BDR is also adjacent to all routers on the network, and becomes DR when the previous Designated Router fails. The BDR does not generate a network-LSA message for the network. When the BDR transmission to a working DR, it generates a network-LSA message.

If a network device is not elected to become DR or BDR in the network, it is a DR-Other device.

FIG. 2 shows a flowchart of a method according to an embodiment of the present disclosure, which may be performed by a network device in a network, for example a DR-Other router 30-1, 30-2, or 30-3 in FIG. 1, or a server with DR-Other function. The network device such as DR-Other router 30-1, 30-2, or 30-3 in FIG. 1 may provide means or modules for accomplishing various parts of the method 200 as well as means or modules for accomplishing other processes in conjunction with other components.

When a BDR has not declared to be a working DR in an OSPF network, the network device may detect a failure event due to a failure DR as illustrated by block 202.

At block 204, the network device holds refresh of router-Link State Advertisements (router-LSA) in a link-state database and holds the flooding procedure.

The flooding procedure may comprise flooding at least one LSA message to at least one neighbor network device. The DR failure event may comprises at least one of: Failure event trigged by OSPF Hello mechanism, and Failure event trigged by Bidirectional Forwarding Detection (BFD) session down. The OSPF network may be OSPF Broadcast network or OSPF Non-Broadcast Multiple Access (NBMA) network.

In accordance with another exemplary embodiment, the network device such as a DR-Other router 30-1, 30-2, or 30-3 in FIG. 1 may further remove at least one routing entry whose next hop is the failure DR in a routing table.

In accordance with another exemplary embodiment, the network device such as a DR-Other router 30-1, 30-2, or 30-3 in FIG. 1 may further start a timer to wait for the BDR declared to be the working DR.

In accordance with another exemplary embodiment, the network device such as a DR-Other router 30-1, 30-2, or 30-3 in FIG. 1 may further receive a network-LSA message from a working DR.

In accordance with another exemplary embodiment, the network device such as a DR-Other router 30-1, 30-2, or 30-3 in FIG. 1 may further stop the timer when a network-LSA message is received from the working DR.

In accordance with another exemplary embodiment, the network device such as a DR-Other router 30-1, 30-2, or 30-3 in FIG. 1 may further hold route calculation to prevent update of the routing table.

In accordance with another exemplary embodiment, the network device such as a DR-Other router 30-1, 30-2, or 30-3 in FIG. 1 may further refresh router-LSA in the link-state database and proceeding with the flooding procedure when the timer is stopped or expired.

In accordance with another exemplary embodiment, the network device such as a DR-Other router 30-1, 30-2, or 30-3 in FIG. 1 may further proceed with route calculation and updating the routing table.

FIG. 3 shows a flowchart of a method according to an embodiment of the present disclosure, which performed by a network device in a network, for example a DR-Other router 30-1, 30-2, or 30-3 in FIG. 1, or a server with DR-Other function. The network device such as DR-Other router 30-1, 30-2, or 30-3 in FIG. 1 may provide means or modules for accomplishing various parts of the method 300 as well as means or modules for accomplishing other processes in conjunction with other components.

When a network-Link State Advertisement (LSA) message is received or a timer is expired, the network device refreshes router-LSA in a link-state database as illustrated by block 302. The network-LSA message is received from the working DR.

At block 304, network device proceeds with flooding procedure in the OSPF network after the step shown in block 302. The flooding procedure comprises flooding at least one LSA message to at least one neighbor network device.

For example, the flooding procedure may comprise flooding at least one LSA message to at least one neighbor network device. Further, the network-LSA message is received from the working DR. The OSPF network may be OSPF Broadcast network or OSPF Non-Broadcast Multiple Access (NBMA) network.

In accordance with another exemplary embodiment, the network device such as a DR-Other router 30-1, 30-2, or 30-3 in FIG. 1 may further proceed with route calculation and updating a routing table.

In accordance with another exemplary embodiment, the network device such as a DR-Other router 30-1, 30-2, or 30-3 in FIG. 1 may further detect a DR failure event due to a failure DR.

In accordance with another exemplary embodiment, the network device such as a DR-Other router 30-1, 30-2, or 30-3 in FIG. 1 may further hold refresh of router-LSA in a link-state database and flooding procedure, when a BDR has not declared to be a working DR.

The DR failure event may be Failure event trigged by OSPF hello mechanism or Failure event trigged by Bidirectional Forwarding Detection (BFD) session down.

In accordance with another exemplary embodiment, the network device such as a DR-Other router 30-1, 30-2, or 30-3 in FIG. 1 may further remove at least one routing entry whose next hop is the failure DR in the routing table.

In accordance with another exemplary embodiment, the network device such as a DR-Other router 30-1, 30-2, or 30-3 in FIG. 1 may further start a timer to wait for the BDR declared to be a working DR.

In accordance with another exemplary embodiment, the network device such as a DR-Other router 30-1, 30-2, or 30-3 in FIG. 1 may further stop the timer when the network-LSA event is received from the working DR.

In accordance with another exemplary embodiment, the network device such as a DR-Other router 30-1, 30-2, or 30-3 in FIG. 1 may further hold the route calculation to prevent update of the routing table.

Figure 4:
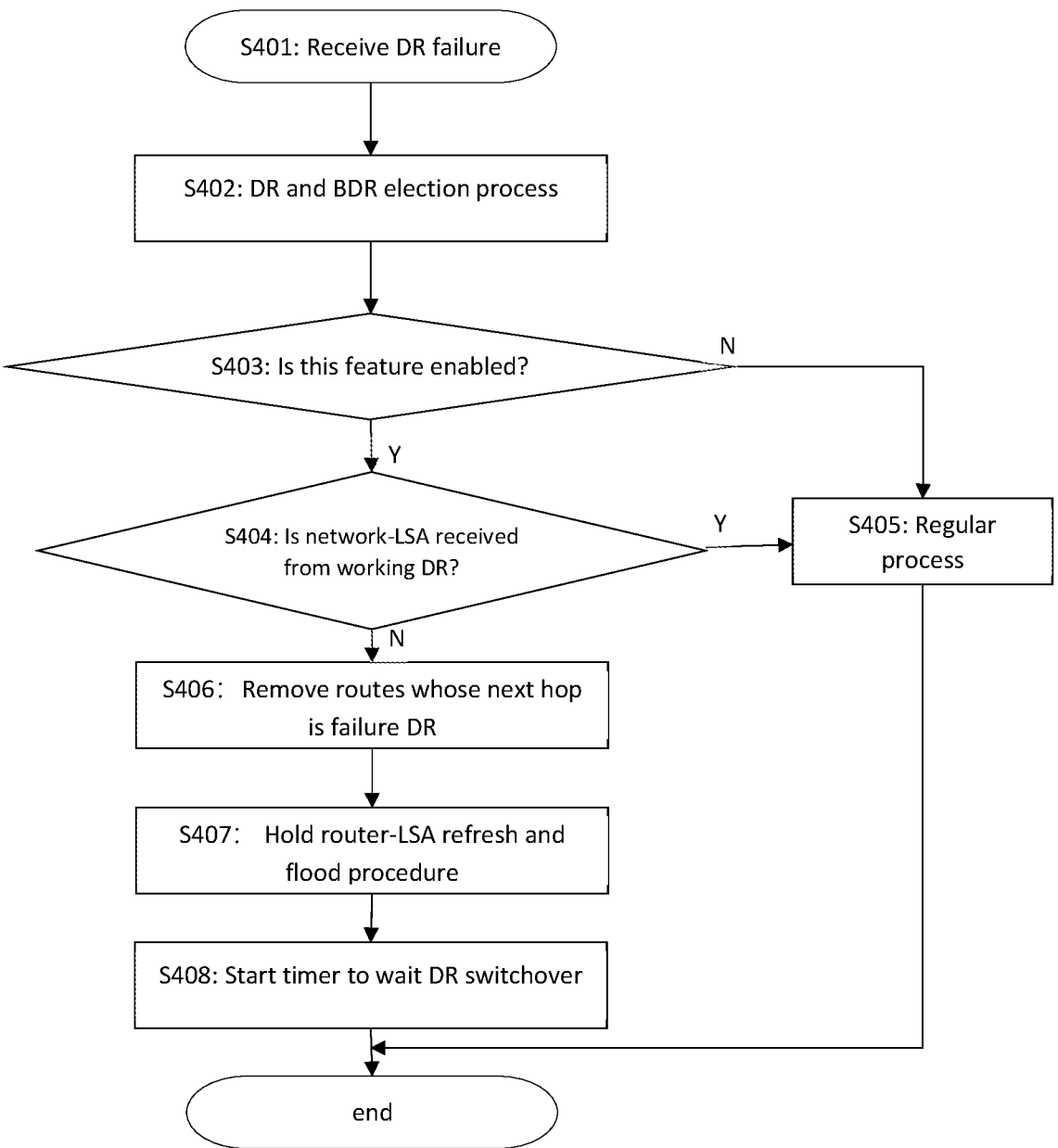
FIG. 4 shows a flowchart of a method according to an embodiment of the present disclosure.

FIG. 4 shows a flowchart of a method according to an embodiment of the present disclosure, which may be performed by a network device.

At step S401, the network device such as DR-Other router 30-1, 30-2, or 30-3 in FIG. 1 detects a DR failure event due to a failure DR.

The DR failure event may be Failure event trigged by OSPF hello mechanism, or Failure event trigged by Bidirectional Forwarding Detection (BFD) session down.

The detection of DR failure event including received a failure event or message from other network devices, or detected the DR failure event by itself.

At step S402, network device such as DR-Other router 30-1, 30-2, or 30-3 in FIG. 1 proceeds DR and BDR election process. This process is used to calculate DR and BDR of a network. The calculation result is as follows. If the network device is chosen as DR, then its new interface state is DR. If the network device is chosen as BDR, then its new interface state is Backup. Otherwise, its new interface state is DR Other. If the interface state of a network device is DR Other, we call the network device DR-Other device. The detailed process could reference section 9.4 Electing the Designated Router in the RFC 2328.

At step S403, the network device checks if the present disclosure feature is enabled. If it is enabled, it proceeds step S404, otherwise it proceeds step S405.

At step S404, the network device checks if it has received a network-LSA message from the new working DR. If the message is not received, it proceeds step S406. If the message is received, then it proceeds step S405.

At step S404, the network device checks if it has received a network-LSA message from the new working DR. If the message is not received, it proceeds step S406. If the message is received, then it proceeds step S405.

The method used to check if the network-LSA is received from the working DR is as follows. The network device checks corresponding router link from self-originated router-LSA, then gets the first parameter from Link ID domain. Further, when the network device receives a Network-LSA message, it gets a second parameter from the Advertising Router domain of the Network-LSA message. Then, the network device compares the first parameter and the second parameter. If they are same, the Network-LSA is from the working DR. Otherwise, it is not from the working DR.

At step S405, the network device proceeds the legacy regular process.

At step S406, the network device removes at least one routing entry whose next hop is the failure DR in its routing table.

At step S407, the network device holds refresh of router-LSA in a link-state database and holds the flooding procedure. The flooding procedure comprises flooding at least one LSA message to at least one neighbor network device. This step corresponds to Block 204 in FIG. 2.

At step S408, the network device starts a timer to wait for the DR switchover. When the BDR declared to be the working DR, the switchover is success.

When DR failure happens and BDR is not declared to the new working DR, the network device removes the routing entries whose next hop value is failure DR in step S406. Meanwhile, it keeps the other routing entries whose next hop value is not failure DR in the routing table. When the traffic whose destination IP prefix could match the IP Prefix in the routing table of the network device, the traffic forwards to the destination seamlessly without traffic loss. The traffic drop during DR switchover may be prevented. Further, as the network device holds refresh of router-LSA in a link-state database and flooding procedure, it can decrease the usage of CPU and memory resource of the network device.

Figure 5:
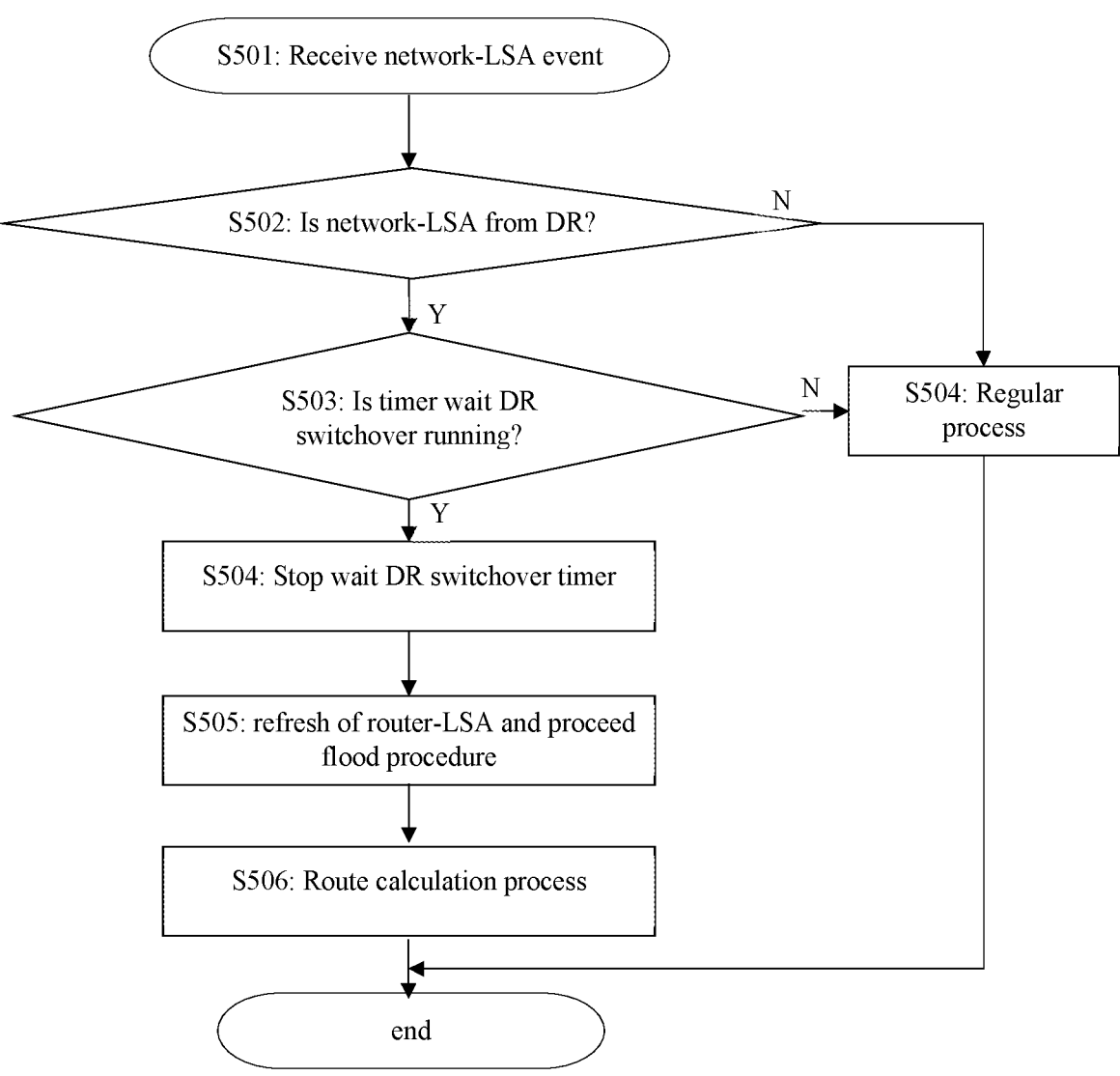
FIG. 5 shows a flowchart of a method according to an embodiment of the present disclosure.

FIG. 5 shows a flowchart of a method according to an embodiment of the present disclosure, which may be performed by a network device.

At step S501, the network device such as DR-Other router 30-1, 30-2, or 30-3 in FIG. 1 receives a network-LSA message from a working DR.

At step S502, the network device checks if the network-LSA is received from the working DR.

A step S503, the network device checks if the timer is expired. If it is not expired, the network device proceeds step S505, otherwise it proceeds step S504.

A step S504, the network device proceeds the legacy regular process.

At step S505, the network device stops the timer, which is started to wait the DR switchover process. When a network-LSA message is received from the working DR, the BDR has declared to be the working DR, the timer can be stopped.

At step S506, the network device refreshes router-LSA in the link-state database and proceeds with the flooding procedure when the timer is expired.

At step S507, the network device proceeds with route calculation. The routing algorithm could be Shortest Path First, SPF, or other algorithms.

At step S508, the network device updates the routing table.

Figure 6:
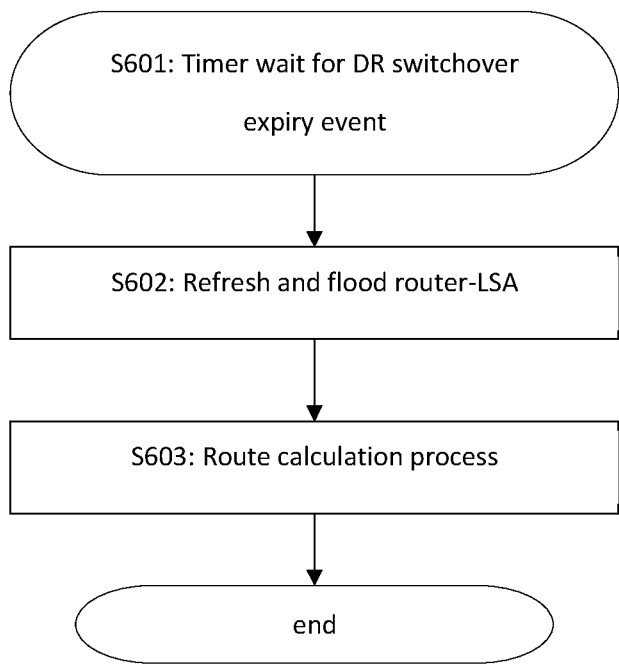
FIG. 6 shows a flowchart of a method according to an embodiment of the present disclosure.

FIG. 6 shows a flowchart of a method according to an embodiment of the present disclosure, which may be performed by a network device such as DR-Other router 30-1, 30-2, or 30-3 in FIG. 1.

At step S601, the network device detects if the network device gets a timer expiry event. When the timer is expired, it proceeds step S602.

The timer expiry event can be detected through an interrupt event generated by the network device itself or can be received from outside network devices.

At step S602, the network device refreshes router-LSA in the link-state database and proceeds with the flooding procedure when the timer is expired.

At step S603, the network device proceeds with route calculation. The routing algorithm could be SPF, or other routing algorithms.

After step S603, the network device updates its routing table.

From FIG. 2 to FIG. 6, the network device could be a DR-Other router, a physical or virtualized server with DR-Other function.

Figure 7:
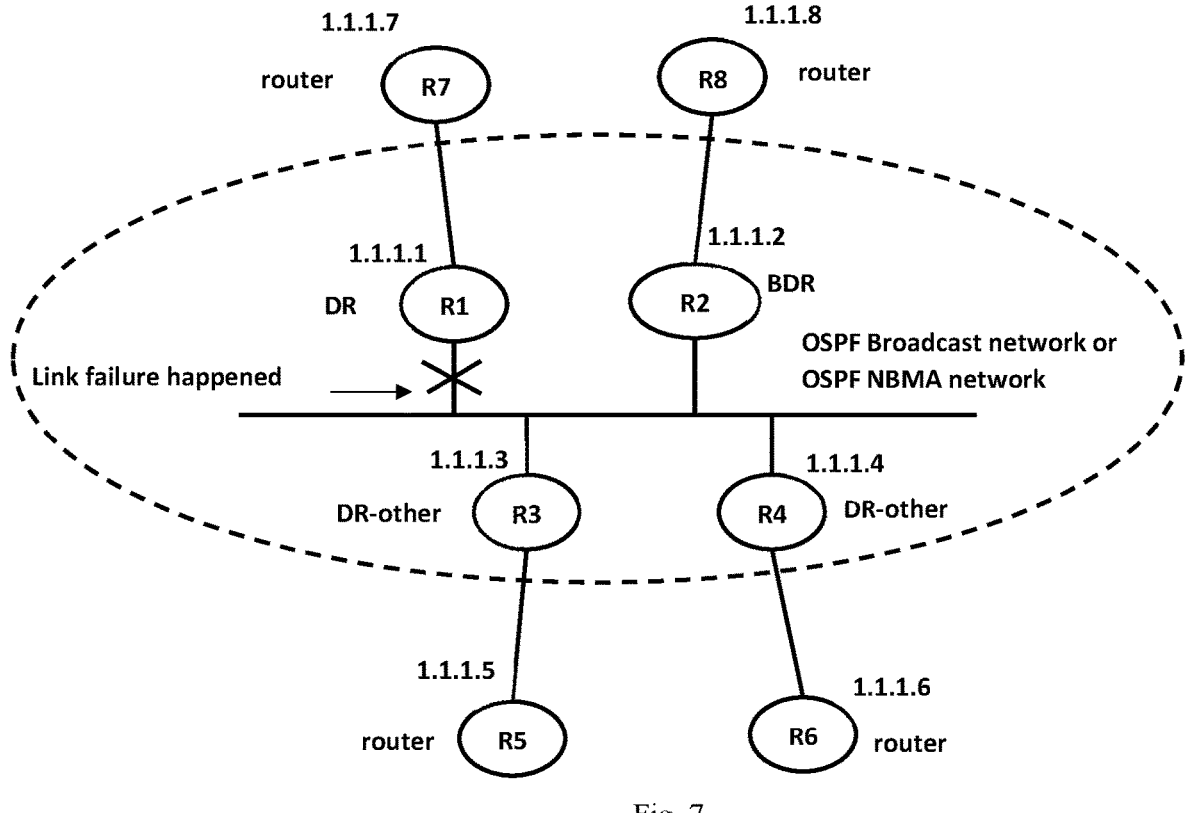
FIG. 7 shows an embodiment of DR seamless switchover for use in some embodiments of the disclosure.

FIG. 7 shows an embodiment of DR seamless switchover according to another embodiment of the present disclosure.

In FIG. 7, there are eight routers from R1 to R8 in an OSPF network. In the initial phase, R1 is DR, and R2 is BDR. R3 and R4 are DR-Others. R5, R6, R7, and R8 are routers connected to the OSPF broadcast network or OSPF NBMA network. All routers use SPF algorithm to calculate their routing tables. The routing table of R3 and R5 at this phase are shown in Table 1 and Table 2.

TABLE 1

| Initial routing table of R3 | |
|---|---|
| Prefix | Next-hop |
| 1.1.1.1 | R1 |

TABLE 1-continued

| Initial routing table of R3 | |
| --- | --- |
| Prefix | Next-hop |
| 1.1.1.2 | R2 |
| 1.1.1.3 | — |
| 1.1.1.4 | R4 |
| 1.1.1.5 | R5 |
| 1.1.1.6 | R4 |
| 1.1.1.7 | R1 |
| 1.1.1.8 | R2 |

TABLE 2

| Initial routing table of R5 | |
| --- | --- |
| Prefix | Next-hop |
| 1.1.1.1 | R3 |
| 1.1.1.2 | R3 |
| 1.1.1.3 | R3 |
| 1.1.1.4 | R3 |
| 1.1.1.5 | — |
| 1.1.1.6 | R3 |
| 1.1.1.7 | R3 |
| 1.1.1.8 | R3 |

The legacy regular process without the present disclosure is as follows. When a link failure of DR happens in a network and before BDR declared to be the working DR, this is the DR switchover period. When DR-Other device detects DR failure, it performs DR election procedure. Then it refreshes self-originated router-LSA in its database and floods the router-LSA messages to its neighbors. Then DR-Other device calculates the routes and updates its routing table. As no valid network-LSA message presents the information of the network and its attached routers, DR-Other device can't compute routing entries through the network successfully. Finally, DR-Other device removes the affected routing entries in its routing table.

For example, with the legacy regular process, when DR R1 failed and BDR R2 is not declared to be the DR, this is the DR switchover period. R3 refreshes the router-LSA in its database and floods the router-LSA messages to its neighbors. Then R3 calculates the routes and updates its routing table. As the latest link state information of the network isn't sent out by BDR through the network-LSA message, so R3 can't receive the latest network link information. Then, R3 removes the routing entries whose next hop is R1, R2, R4 from the routing table of it. As R5 is directly connected with R3, so R3 can get the link status of R5. The routing entry whose next hop is R5 remains in its routing table. The routing table of R3 with the legacy regular process is shown in Table 3.

TABLE 3

| The routing table of R3 with legacy method | |
| --- | --- |
| Prefix | Next-hop |
| 1.1.1.3 | — |
| 1.1.1.5 | R5 |

From FIG. 7 we can see that only the link connected with R1 failed, that means the traffic whose next hop is R1 can't route to its destination. But from FIG. 7 we can see that the other links connected to R2, R4, and R5 are still working, that means the traffic whose next hop is any one of R2, R4, or R5 can reach the destination IP prefix. But with the legacy regular process, the traffic whose next hop is R2 or R4 is lost.

The legacy regular process of router R5 is same with R3. The routing table of R5 is shown in Table 4.

TABLE 4

| The routing table of R5 with legacy regular method | |
| --- | --- |
| Prefix | Next-hop |
| 1.1.1.3 | R3 |
| 1.1.1.5 | — |

The DR seamless switchover with the present disclosure is like follows.

DR-Other device R3 detects a DR failure when the DR R1 link failure happens. Then, R3 proceeds the DR and BDR election process. In this process, R3 calculates DR and BDR of the network.

R3 checks if a network-LSA message is received from the working DR. If the message is not received, it removes all the routing entries whose next hop is the R1 (failure DR) in the routing table. From Table 5 we can see that the routing entries whose next hop is R1 (failure DR) is removed. The routing table of R3 with the present disclosure is shown in Table 5.

Then, R3 holds the refresh of router-LSA in its link-state database and holds flooding procedure.

R3 starts a timer to wait for BDR declared to be DR. If the tested average switchover time from a BDR to DR is 2 s in this network, R3 can set a timer longer than that, such as the value of the timer could set 3 s.

From Table 5, we can see that during the DR switchover period, the routing entries whose next hop is R2, R4, R5 are still exist in the routing table of R3. When a traffic whose destination IP prefix is any one of 1.1.1.2, 1.1.1.4, 1.1.1.5, 1.1.1.6 or 1.1.1.8 arrived R3, as the prefix of the traffic could match the routing entry in the routing table of R3, the traffic is forwarded to the destination. So, during the DR switchover time, these traffics are seamless forwarded to the destination without loss. Meanwhile, during the DR switchover time, as R3 holds the refresh router-LSA in the link-state database and flooding procedure, the usage of CPU and memory resource of R3 is decreased.

TABLE 5

| The routing table of R3 with the present disclosure | |
| --- | --- |
| Prefix | Next-hop |
| 1.1.1.2 | R2 |
| 1.1.1.3 | — |
| 1.1.1.4 | R4 |
| 1.1.1.5 | R5 |
| 1.1.1.6 | R4 |
| 1.1.1.8 | R2 |

R5 is another router in the OSPF network, which connects to the OSPF broadcast network or OSPF NBMA network. The routing table of R5 with the present disclosure is shown in Table 6. With the present disclosure, when a traffic whose destination IP prefix is any one of 1.1.1.2, 1.1.1.3, 1.1.1.4, 1.1.1.6, 1.1.1.7 or 1.1.1.8 arrived R5, as the prefix of the traffic could match the routing entry in the routing table of R5, the traffic is forwarded to the destination. During the DR switchover time, these traffics are seamless forwarded to the destination without loss. So, the present disclosure could also benefit the routers outside of the OSPF broadcast network or OSPF NBMA network in the OSPF domain during the DR switchover period.

TABLE 6

The routing table of R5 with the present disclosure

| Prefix | Next-hop |
|--------|----------|
| 1.1.1.1 | R3 |
| 1.1.1.2 | R3 |
| 1.1.1.3 | R3 |
| 1.1.1.4 | R3 |
| 1.1.1.5 | — |
| 1.1.1.6 | R3 |
| 1.1.1.7 | R3 |
| 1.1.1.8 | R3 |

When R3 receives a network-LSA message, it checks if the message is from DR. If the message is not from the working DR, it proceeds the legacy regular process. If the message is from the working DR and the timer which is started to wait for BDR declared to DR is not expired, it stops the timer. Then R3 refreshes the router-LSA in the link-state database and floods the Router-LSA to its neighbor routers.

R3 uses SPF algorithm to calculate the route entries in the network. The detailed SPF algorithm could reference the RFC 2328.

R3 update the routing table based on SPF calculation result.

Figure 8:
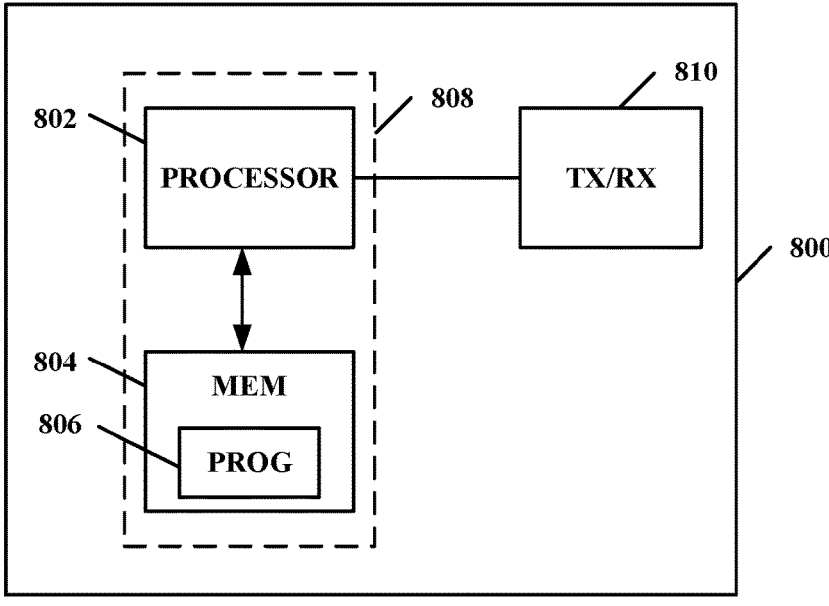
FIG. 8 is a block diagram showing an apparatus suitable for use in some embodiments of the disclosure.

FIG. 8 is a block diagram showing an apparatus suitable for practicing some embodiments of the disclosure. For example, any one of the network devices described above may be implemented as or through the apparatus 800.

Figure 9:
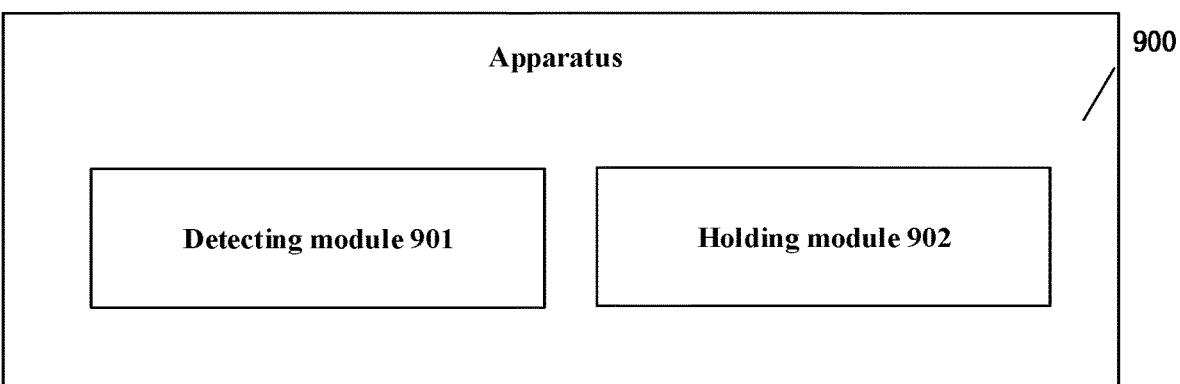
FIG. 9 is a block diagram showing a provided apparatus in a network device according to an embodiment of the disclosure.

FIG. 9 is a block diagram showing a network device according to an embodiment of the disclosure.

As shown, the network device 900 comprises a detecting module 901 and a holding module 902. The detecting module 901 may detect a Designated Router (DR) failure event due to a failure DR. The holding module 902 may hold refresh of router-LSA in a link-state database and flooding procedure, when a Backup Designated Router (BDR) has not declared to be a working DR in an OSPF network.

Figure 10:
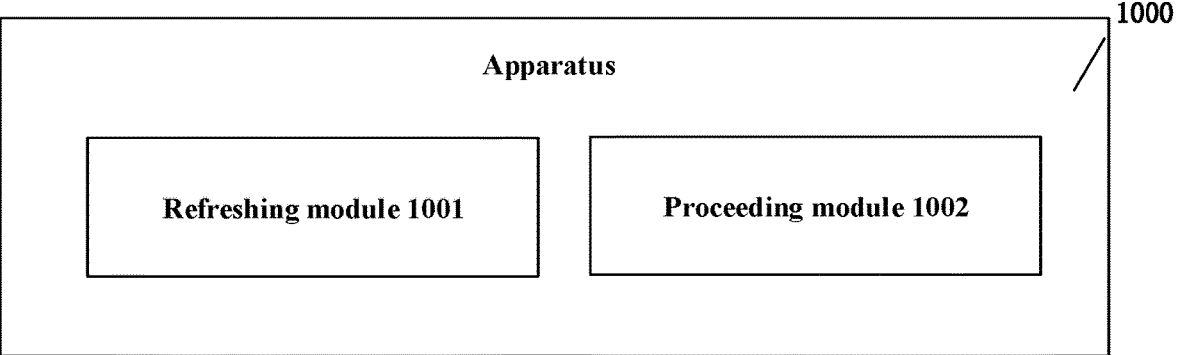
FIG. 10 is a block diagram showing a provided apparatus in a network device according to an embodiment of the disclosure.

FIG. 10 is a block diagram showing a network device according to an embodiment of the disclosure.

As shown, the network device 1000 comprises a refreshing module 1001 and a proceeding module 1002. When a network-Link State Advertisement, LSA, message is received or a timer is expired, the refreshing module 1001 may refresh router-LSA in a link-state database; the proceeding module 1002 may proceed with flooding procedure in an Open Shortest Path First, (OSPF) network. The refreshing router-LSA in the link-state database and proceeding with flooding procedure have been held due to a Designated Router (DR) failure event.

The apparatus 800 comprises at least one processor 802, such as a digital processor (DP), and at least one memory (MEM) 804 coupled to the processor 802. The apparatus 800 may further comprise a transmitter TX and receiver RX 810 coupled to the processor 802. The MEM 804 stores a program (PROG) 806. The PROG 806 may include instructions that, when executed on the associated processor 802, enable the apparatus 800 to operate in accordance with the embodiments of the present disclosure. A combination of the at least one processor 802 and the at least one MEM 804 may form processing means 808 adapted to implement various embodiments of the present disclosure.

Various embodiments of the present disclosure may be implemented by computer program executable by one or more of the processor 802, software, firmware, hardware or in a combination thereof.

The MEM 804 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 802 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network node, the memory 804 contains instructions executable by the processor 802, whereby the network node operates according to any of the methods related to the network node as described above.

In an embodiment where the apparatus is implemented as or at the application node, the memory 804 contains instructions executable by the processor 802, whereby the application node operates according to any of the methods related to the application node as described above.

Hereinafter, the solutions will be further described as follows.

RFC 2328, STD 54, April 1998, describes the basic implementation of OSPF. Every broadcast and NBMA network have a Designated Router (DR). The DR forms adjacent to all other routers. The Designated Router originates a network-LSA on behalf of the network. This LSA lists the set of routers currently attached to the network. BDR is Backup Designated Router for each broadcast and NBMA network. The Backup Designated Router also forms adjacent neighbors to all routers in the network, and becomes Designated Router when the previous Designated Router fails. The Backup Designated Router does not generate a network-LSA for the network.

To speed up failure detection between adjacent routers, Bidirectional Forwarding Detection (BFD) may be used. BFD can detect the bidirectional path faults between such routers faster than OSPF hello mechanism does.

When DR fails, DR-Other routers waits BDR to declare as new DR, this may take a few of seconds or longer in large scale networks.

When OSPF DR fails, all other routers could detect this failure quickly by BFD. In this case, the network-LSA originating by previous failure DR becomes invalid. All DR-Other routers can't compute routes successfully in time before BDR becomes DR and originates new network-LSA.

Before the DR-Other routers receive network-LSA from new DR, the network will fail. The routers will uninstall routes first when DR fails, then re-install routes after new DR advertises network-LSA. The traffic drop consequently happens during the period of DR switchover. DR switchover may be fast or slow in the practical networks, it depends on the router performance and system busy status of BDR. In general, this procedure may take one or more seconds, or even longer in large scale networks to complete topology convergency. The inter-area routes and as-external routes are affected as well as OSPF intra-area routes.

For all networking customers, who use voice, video, self-driving, or other applications, the traffic breakage brings bad experience.

This present disclosure is applicable to OSPF broadcast or NBMA network.

This present disclosure requires both BR and BDR exist in the network and have already formed adjacencies to all DR-Other routers.

In this present disclosure, a timer named waitDRSwitchoverTimer is defined.

When a DR-Other router detects event of DR failure, if BDR has not declared to become new DR, DR-Other initiates waitDRSwitchoverTimer.

After received network-LSA message from new DR, DR-Other stops waitDRSwitchoverTimer. Then it refreshes and floods Router-LSA. Further, it starts SPF calculation process.

If the timer waitDRSwitchoverTimer expires, but no network-LSA message is received from new DR, DR-Other router refreshes and floods router-LSA, then starts SPF calculation process.

This idea realizes DR switchover smoothly. If DR fails, DR-Other router does not calculate routes immediately, instead, it waits for new DR declaration for a period of time of waitDRSwitchoverTimer.

The MPLS network and BGP VPN service may benefit from the stable IP routing table.

Traffic drop during DR switchover may be prevented. Further, decrease usage of system CPU and memory resource.

This present disclosure is applicable to OSPF broadcast or NBMA network.

This present disclosure is applicable to OSPFv2, OSPFv3, and further protocols which can compatible to OSPFv2 and OSPFv3.

This present disclosure requires both BR and BDR exist in the network and have already formed adjacencies to all DR-Other routers.

OSPF DR and BDR take important role in broadcast and NBMA network. But sometimes, the DR may fail because of link fault, node fault or networking maintenance. In this scenario, the BDR becomes new DR and starts to take DR role. Before the new DR is declared, the OSPF routes in DR-Other routers will be removed and traffic drop occurs for some time.

This present disclosure introduces a method to support seamless DR switchover. With this idea, the OSPF route will be processed smoothly during DR switchover and no traffic loss happens.

This present disclosure defines timer waitDRSwitchoverTimer which is used for realizing OSPF DR seamless switchover. DR-Other routers will hold router-lsa refresh and route calculation for period of waitDRSwitchoverTimer interval till new DR declares and originates network-LSA.

This present disclosure could be deployed on one or multiple nodes separately in the broadcast or NBMA networks, it depends on administrator's decision.

In FIG. 4, DR-Other router in the network receives DR failure event, which may be generated by BFD or other mechanisms. Then, it proceeds DR election process. The BDR becomes new DR after the election eventually.

In the DR-Other router, if the present disclosure feature is enabled and network-LSA message has not received from new DR, the routes whose next hop is previous failure DR are removed from its routing table.

DR-Other router holds router-LSA refresh. Further, it holds the flood of router-LSAs to its neighbors.

DR-Other router starts timer named waitDRSwitchoverTimer to wait new DR declaration.

In FIG. 5, DR-Other router receives a network-LSA from DR. The network-LSA carries router list in the network. If timer waitDRSwitchoverTimer is running, the timer is stopped. Further, route calculation procedure is invoked.

In FIG. 6, when DR-Other router receives an event of timer waitDRSwitchoverTimer expiry, it refreshes and floods router-LSA. Then, it invokes route calculation procedure. In this scenario, no new DR is declared in time, it may be caused by: the BDR is out of service as well, or the interval value of timer waitDRSwitchoverTimer is too small.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above. The carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

ABBREVIATION EXPLANATION

DR Designated Router
BDR Backup Designated Router
OSPF Open Shortest Path First
RFC Request For Comments
LSA Link State Advertisements
NBMA Non-Broadcast Multiple Access
BFD Bidirectional Forwarding Detection
SPF Shortest Path First

What is claimed is:

1. A method performed by a network device comprising:
detecting a designated router (DR) failure event; and
after detecting the designated router failure event and when a backup designated router (BDR) has not declared to be a working designated router, (i) refraining from refreshing router-Link State Advertisements (LSA) in a link-state database and (ii) refraining from performing a flooding procedure.

2. The method of claim 1, wherein the flooding procedure comprises flooding at least one LSA message to at least one neighbor network device.

3. The method of claim 1, wherein the DR failure event comprises at least one of:
Failure event trigged by open shortest path first (OSPF) hello mechanism;
Failure event trigged by Bidirectional Forwarding Detection (BFD) session down.

4. The method of claim 1, wherein the network device is in an open shortest path first (OSPF) network, the OSPF network comprising at least one of:
OSPF Broadcast network;
OSPF Non-Broadcast Multiple Access network.

5. The method of claim 1, further comprising:
removing at least one routing entry whose next hop is the failure DR in a routing table.

6. The method of claim 1, further comprising:
starting a timer to wait for the BDR declared to be the working DR.

7. The method of claim 1, further comprising:
receiving a network-LSA message from a working DR.

8. The method of claim 6, further comprising:
stopping the timer when a network-LSA message is received from the working DR.

9. The method of claim 1, further comprising:
refraining from performing a route calculation to prevent update of the routing table.

10. The method of claim 6, further comprising:
refreshing router-LSA in the link-state database and performing the flooding procedure when the timer is stopped or expired.

11. The method of claim 9, further comprising:
performing the route calculation;
updating the routing table.

12. The method of claim 1, wherein the network device is a DR-Other router or a server with DR-Other function.

13. A method performed by a network device, when a network-Link State Advertisement (LSA) message is received or a timer is expired, the method comprises:
refreshing router-LSA in a link-state database; and
performing a flooding procedure, wherein the refreshing router-LSA in the link-state database and performing the flooding procedure have been refrained from due to a designated router (DR) failure event.

14. The method of claim 13, wherein the flooding procedure comprises flooding at least one LSA message to at least one neighbor network device.

15. The method of claim 13, wherein the network-LSA message is received from the working DR.

16. The method of claim 13, wherein the network device is in an open shortest path first (OSPF) network, the OSPF network comprising at least one of:
OSPF Broadcast network;
OSPF Non-Broadcast Multiple Access, NBMA network.

17. The method of claim 13, the method further comprising:
performing a route calculation;
updating a routing table.

18. The method of claim 13, further comprising:
detecting a DR failure event;
after detecting the DR failure event and when a backup designated router (BDR) has not been declared to be a working designated router, (i) refraining from refreshing router-Link State Advertisements (LSA) in a link-state database and (ii) refraining from performing a flooding procedure.

19. The method of claim 18, wherein the DR failure event comprises at least one of:
Failure event trigged by open shortest path first (OSPF) hello mechanism;
Failure event trigged by Bidirectional Forwarding Detection (BFD) session down.

20. A network device, comprising:
one or more processors; and one or more memories comprising computer program codes, the one or more memories and the computer program codes configured to, with the one or more processors, cause the network device at least to perform:

detecting a designated router (DR) failure event; and after detecting the designated router failure event and when a backup designated router (BDR) has not been declared to be a working designated router, (i) refraining from refreshing router-Link State Advertisements (LSA) in a link-state database and (ii) refraining from performing a flooding procedure.

* * * * *